(12) United States Patent
Graepel et al.

(10) Patent No.: US 7,702,482 B2
(45) Date of Patent: Apr. 20, 2010

(54) DEPENDENCY STRUCTURE FROM TEMPORAL DATA

(75) Inventors: Thore K H Graepel, Cambridge (GB); Ralf Herbrich, Cambridge (GB); Shyansundar Rajaram, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 1431 days.

(21) Appl. No.: 11/027,188

(22) Filed: Dec. 30, 2004

(65) Prior Publication Data

US 2006/0164997 A1 Jul. 27, 2006

(51) Int. Cl.
*G06F 17/18* (2006.01)
(52) U.S. Cl. .................................. 702/179; 702/181
(58) Field of Classification Search ............. 702/66, 702/69–70, 75, 79, 176–179, 181; 375/225–226
See application file for complete search history.

(56) References Cited

U.S. PATENT DOCUMENTS

| | | | | |
|---|---|---|---|---|
| 5,896,552 | A * | 4/1999 | Kowert et al. ................. | 710/55 |
| 6,618,725 | B1 * | 9/2003 | Fukuda et al. ................. | 707/6 |
| 2004/0002969 | A1 * | 1/2004 | Perng et al. .................... | 707/3 |
| 2005/0172306 | A1 * | 8/2005 | Agarwal et al. .............. | 719/328 |
| 2006/0041659 | A1 * | 2/2006 | Hasan et al. .................. | 709/224 |

OTHER PUBLICATIONS

Gal et al., A Mutliagent Update Process in a Database with Temporal Data Dependencies and Schema Versioning, Jan./Feb. 1998, IEEE Transactions on Knowledge and Data Engineering, vol. 10 No. 1, pp. 21-37.*

Rajaram, et al., "Poisson Networks: A Model for Structured Point Processes", Proceedings of the AI STATS 2005 Workshop, 2005. pp. 1-8.
Nodelman, et al. "Learning Continuous Time Bayesian Networks." Proc. Nineteenth Conference on Uncertainty in Artificial Intelligence (UAI), 2003. pp. 451-458.
Herbrich, et al. "TrueSkill: A Bayesian Skill Rating System", pp. 1-8, NIPS : Conferences : 2006.
Nodelman, et al., "Continuous Time Bayesian Networks." Proceedings of the Eighteenth Conference on Uncertainty in Artificial Intelligence, (UAI), 2002. pp. 378-387.
"TrueSkill", http://research.microsoft.com/mlp/apg/trueskill.aspx, Mar. 14, 2008.
"Trueskill—The Details of the TrueSkill™ Ranking System" http://research.microsoft.com/mlp/apg/Details.aspx#How_to_Update_Skills, Mar. 14, 2008.
"TrueSkill—Frequently Asked Questions" http://research.microsoft.com/mlp/apg/faq.aspx, Mar. 14, 2008.
"TrueSkill—The TrueSkill™ Ranking System Calculator(s)" http://research.microsoft.com/mlp/apg/Calculator.aspx, Mar. 14, 2008.

* cited by examiner

*Primary Examiner*—Eliseo Ramos Feliciano
*Assistant Examiner*—Mi'schita' Henson

(57) ABSTRACT

Based on the time series data from multiple components, the systems administrator or other managing entity may desire to find the temporal dependencies between the different time series data over time. For example, based on actions indicated in time series data from two or more servers in a server network, a dependency structure may be determined which indicates a parent/child or dependent relationship between the two or more servers. In some cases, it may also be beneficial to predict the state of a child component, and/or predict the average time to a state change or event of a child component based on the parent time series data. These determinations and predications may reflect the logical connections between actions of components. The relationships and/or predictions may be expressed graphically and/or in terms of a probability distribution.

13 Claims, 7 Drawing Sheets

DEPENDENCY STRUCTURE FROM TEMPORAL DATA

SUMMARY

The following presents a simplified summary of the disclosure in order to provide a basic understanding to the reader. This summary is not an exhaustive or limiting overview of the disclosure. The summary is not provided to identify key and/or critical elements of the invention, delineate the scope of the invention, or limit the scope of the invention in any way. Its sole purpose is to present some of the concepts disclosed in a simplified form, as an introduction to the more detailed description that is presented later.

The task of learning the dependencies among discrete time series data arises in many applications, including failure relationships in server networks, computer vision and/or video analysis events applications, computer processes such as file accesses in databases, failure times in cellular phones, spikes in neural systems, and the like. Discrete time series data is a sequence of data, where each datum has a finite number of value options. For example, the time series data may include a series of states and/or events, where each state and/or event is chosen from a finite number of options. Any number of options may be included, as long as the number is finite, e.g., bounded. However, to increase the computational efficiency of determining a dependency relationship or structure between the time series, the number of state and/or event options may be bounded by an upper boundary, such as ten to twenty options. For example, the following examples are discussed with reference to a server farm, where each server has two states, e.g., up or down.

Based on the time series data from each component, e.g., server in a server network, the systems administrator or other managing entity may desire to find the temporal dependencies between the different time series data over time. More particularly, based on the data values in a time series from one or more parent components, e.g., server, it may be beneficial to learn the dependency structure of a network such as determining a child component whose time series data depends on the time series data of those parents. For example, based on time series data from two or more servers, a dependency structure may be determined which indicates a parent/child or dependent relationship between the two or more servers. In some cases, it may also be beneficial to predict the state of a child component, and/or predict the average time to a state change or event of a child component based on the parent time series data. These determinations and predications may reflect the logical connections between states of components, such as software components, machines, computer systems, and the like. The relationships and/or predictions may be expressed graphically and/or in terms of a probability distribution.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Exemplary Operating Environment

Figure 1:
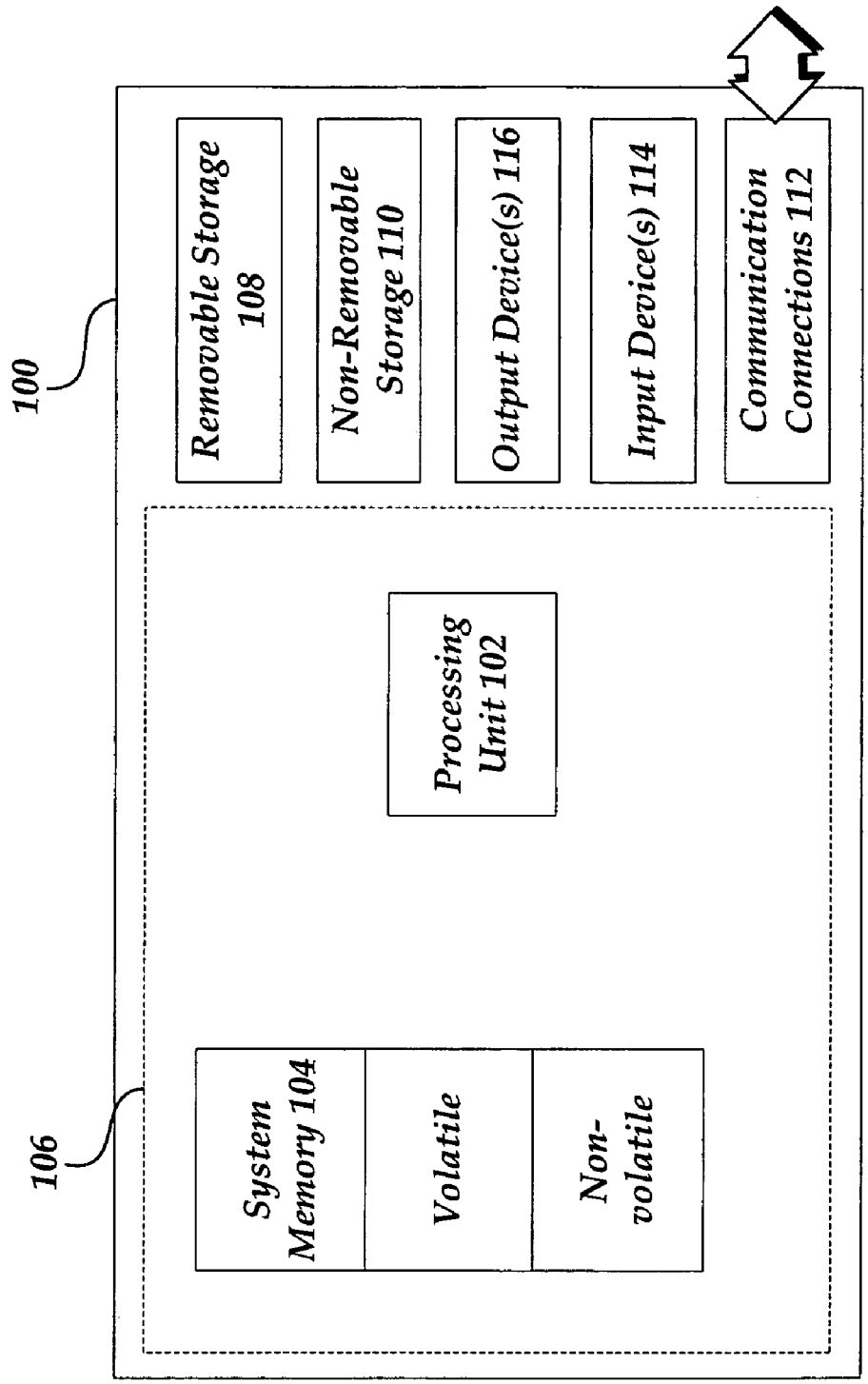
FIG. 1 is an example computing system for implementing a dependency system.

FIG. 1 and the following discussion are intended to provide a brief, general description of a suitable computing environment in which a dependency system may be implemented. The operating environment of FIG. 1 is only one example of a suitable operating environment and is not intended to suggest any limitation as to the scope of use or functionality of the operating environment. Other well known computing systems, environments, and/or configurations that may be suitable for use with a dependency system described herein include, but are not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

Although not required, the dependency system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

With reference to FIG. 1, an exemplary system for implementing the dependency system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communication connection(s) 112 that allow the device 100 to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes both storage media and communication media.

Device 100 may also have input device(s) 114 such as keyboard, mouse, pen, voice input device, touch input device, laser range finder, infra-red cameras, video input devices, and/or any other input device. Output device(s) 116 such as display, speakers, printer, and/or any other output device may also be included.

Dependency Structure

The time series data of two or more components in a system may be attached to a node of a directed graph or node network system, with each time series being associated with a node. In an example of a time series of a server, a node may have one of two states at any specified time, e.g., server up and server down. In an example of a database system, the time series data may be a sequence of events such as file access events and the like. The dependency of the system or network may be established by determining the most likely parent nodes for each node, or time series in the system. Specifically, each time series in the system may depend on one or more other time series, e.g., the parent time series may be used to predict the child node time series data. Alternatively, a child node may have no parents, e.g., the child node time series data may depend on the actions in the parent node time series data. In this manner, the dependency structure of the system may be established by determining if each node of the system has zero, one, or more parent nodes. By determining the relevant parents for each node of the system, the dependency structure of the system may be determined.

The dependency structure of the node network system may be determined by any appropriate method or process, including Bayesian learning. After establishing a structure for the node network system, the temporal data of the nodes may be used to predict the state and/or events of each child node based on the states and/or events of the parent nodes. The prediction for the child node may indicate the average time to the state change and/or event occurrence in the child relative to the state change and/or event occurrence in the parent. The determination of parent-child relationships, prediction of action (state change and/or event occurrence) in the child, and/or the prediction of the time to action in the child may be provided, and may indicate a strength of the relationship, a time dependency of the prediction, and/or a strength of the prediction.

Figure 2:
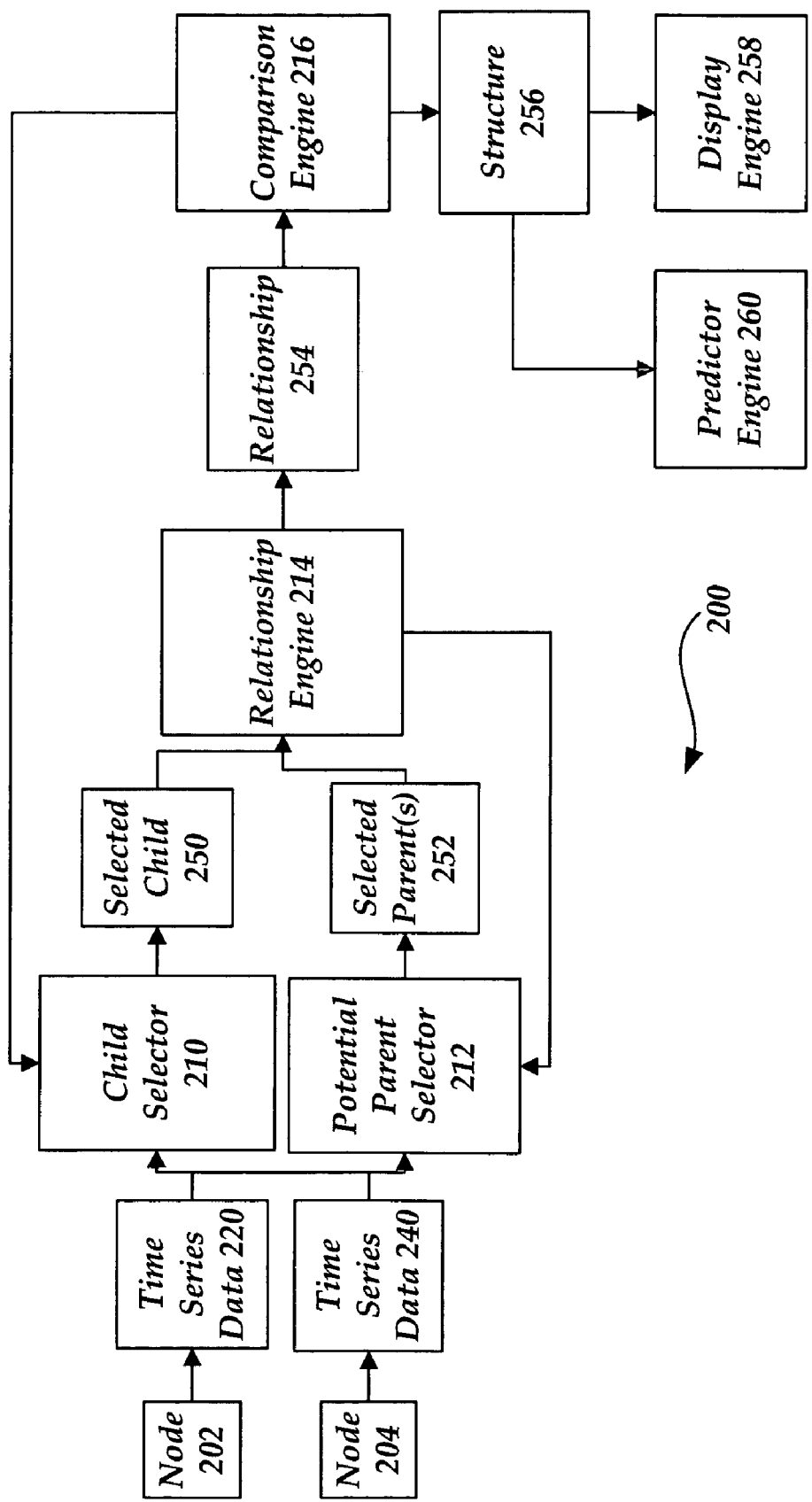
FIG. 2 is a dataflow diagram of an example dependency system.

FIG. 2 illustrates a dependency system 200 for determining dependency structure from temporal data. For example, the dependency system 200 may gather time series data from one or more nodes. As shown in FIG. 2, node 202 provides time series data 220, and node 204 provides time series data 240.

As noted above, each component providing time series data 220, 240 may be any type of computer system, computer system component, software component, sensor, and the like. The time series data 220, 240 may be any discrete time series of data that has a finite number of values.

The time series data may be gathered through any appropriate state and/or event logging system and transformed into component states and/or events. For example, if the node is a server, the time series data of server up and down states may be determined by examining an event log of the server and determining the shutdown and start-up times of the server. The server-down state may be triggered by a 'clean shutdown' and/or 'dirty shutdown' event of the event log, and an up-state of the server may be triggered by a 'start event log' event. In one example, the up and down state data may be derived from event codes 6005, 6006, and 6008 from servers through Microsoft Windows XP® by opening My Computer/Manage and selecting System Tools/EventViewer/System. The timeline of the event log may be discretized into intervals of length $\Delta$ and the state of the system may be determined for that time step and listed as 'server-up', 'server-down', or unknown. The unknown state may account for inconsistencies in the server event logs. For example, a server may not be started or stopped twice in a row without having been stopped or started (respectively) in the intervening time. As a result, the state of the node component may be unknown in the time between two consecutive up or down states.

State Time Series Data

Figure 3:
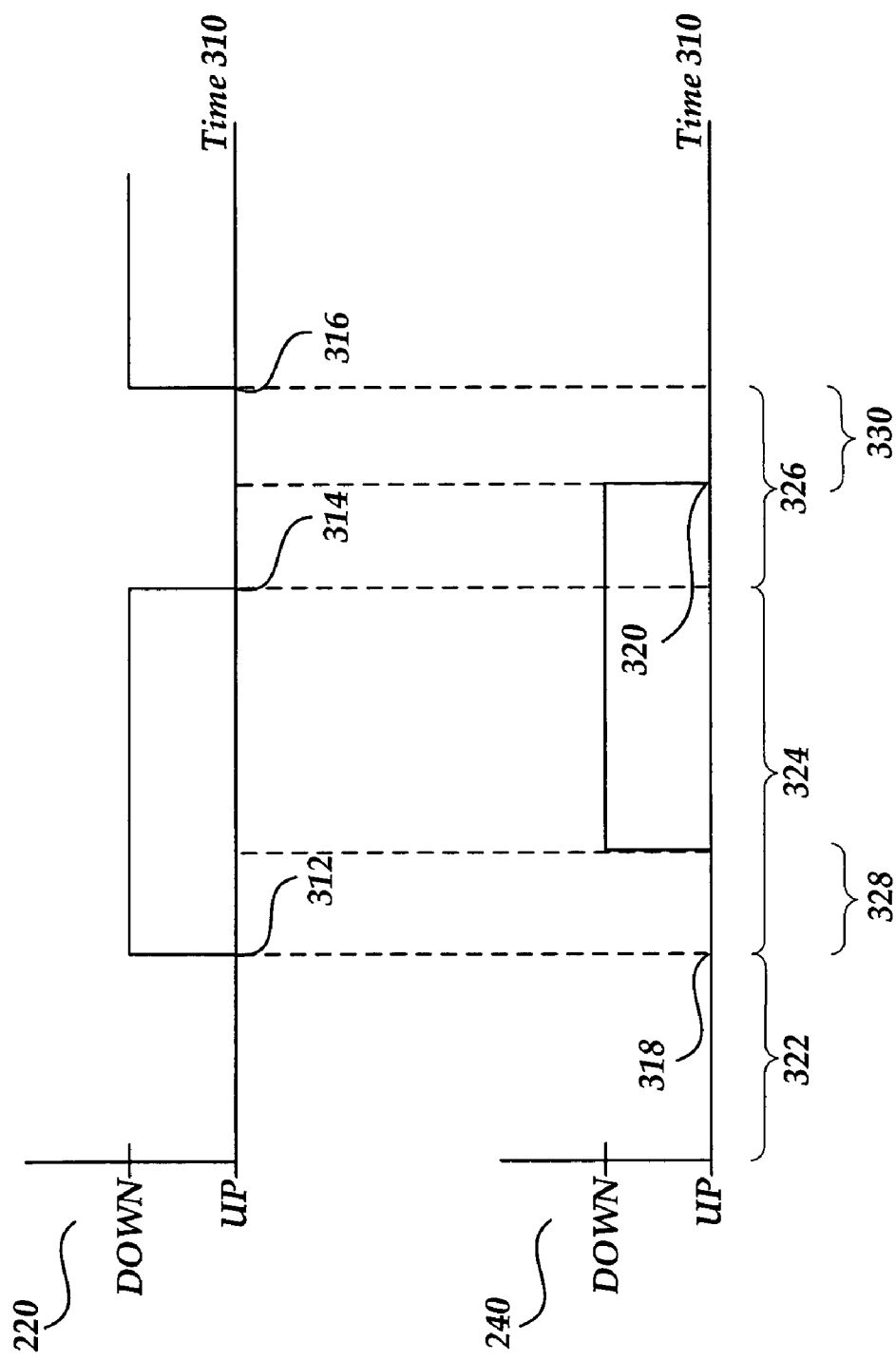
FIG. 3 is a timeline showing example time series state data of two components.

Examples of times series data 220, 240 are shown in FIG. 3, where each component providing time series state data is a server, and the state data is chosen from the set of server up and server down. With a two state system, the time series data may be illustrated as a square wave form, with zero being the up state of the node and one being the down state of the node. The following example is discussed with reference to a two state (up/down) system where 'unknown' states are ignored as data not available in the time of the unknown state. Event action time series data is discussed further below in following examples.

The time series data for each node may be provided and/or stored in any suitable format. For example, a storage array for each node may store a time stamp identifier and state identifier for each time segment in the time series data. In an alternative example, to limit the size of the stored data, the storage array may store a time stamp identifier and state identifier, not for each time step, but for the time of a state change. For example, with reference to FIG. 3, a storage array for node 202 may store a time stamp for t=0 and an indicator of a state of server up, a time stamp for time 312 and an indicator of a state of server down, a time stamp for time 314 and an indicator of a state of server up, and the like.

The storage arrays for each node in the observed system may be concatenated with each other to form a system matrix of time series data. However, in many cases, the storage arrays for each node may be vectors of different lengths and may be stored individually. It is to be appreciated that any suitable data store in any suitable format may be used to store and/or communicate the time series data to the dependency system 200, including a relational database, object-oriented database, unstructured database, an in-memory database, or other data store. A storage array may be constructed using a flat file system such as ACSII text, a binary file, data transmitted across a communication network, or any other file system. Notwithstanding these possible implementations of the foregoing data stores, the term data store and storage array as used herein refer to any data that is collected and stored in any manner accessible by a computer.

With reference to FIG. 2, it may be unknown as to whether node 202 is a parent to node 204, and/or if node 204 is a parent to node 202. If node 202 is a parent to node 204, then the state of node 204 may depend on the state of the node 202. More particularly, there is a temporal relation or dependency of the time series data 240 of the child node 204 on the time series data 220 of the parent node 202. If the time series data 240 of node 204 depends on the time series data 220 of the node 202, then time series data 240 may have similar state characteristics as the parent node.

Dynamic Bayesian Network

Although any suitable process may be used to learn the dependency structure, the following example is discussed with reference to dynamic Bayesian Networks. Dynamic Bayesian networks are an extension of Bayesian networks to temporal processes. Dynamic Bayesian networks model a dynamic system by discretizing time and providing a Bayesian network fragment that represents the probabilistic transition of the state at time t to the state at time t+1. Thus, dynamic Bayesian networks represent the state of the system at different points in time, but do not represent the time explicitly.

As noted above, the time series data may be a time series of actions of a component. For example, an action may be a state change in the component and/or an event occurrence.

In a Bayesian setting, the dependency structure between nodes may be specified by modeling transition properties between actions (e.g., state changes and/or events) for a child node at time t and t+$\Delta$ given the actions of the one or more parent nodes of the child node at time t. If the state of each child node at time t+$\Delta$ is conditioned only on the states of the parent nodes at time t, then the determined structural dependency will not exhibit loops. As a consequence, the structure S of all parent and child nodes may be represented by all parent relationships. More particularly, the overall structure of the network of nodes may be determined by determining the parent nodes of each node in the network system.

In a Bayesian setting, the distribution over all possible node network or system structures of the nodes may be computed given the time series data of all the nodes. In mathematical form, the probability of the structure given the time series data of the child node may be given as:

$$P(S|\{D_i\}) \propto P(\{D_i\}|S) \cdot P(S) = \left[\prod_{i=1}^{N} P(D_i|\{D_j\})\right] \cdot P(S)$$

where P(S) is the probability of the selected structure being evaluated, $D_i$ is the time series data for child node i, N is the number of nodes in the system, and j indicates the parent nodes to child node i. To determine the most likely network structure S*, the structure providing a maximal probability of the structure given the time series data may be selected.

To find the probability of the selected relationship structure S given the actions of the selected child $P(S|\{D_j\})$, the structural prior distribution of the selected structure P(S) of equation (1) above may be assumed to be:

$P(S) = \Pi_i P(\text{the selected parents } j \text{ of node } i) = \Pi_i g(|\text{parents of node } i|)$ which may factor over the N nodes and where g(|parents of node i|) is a normalized function of the number of parents only. In this manner, the dependency structure may be determined by focusing on the data dependent terms of the probability of the data series of child node i ($P(D_i)$) and the probability of the data series i given the data series of the parent node j ($P(D_i|D_j)$). More particularly, finding the optimal overall structure S* may be reduced to finding the most likely parents of each node in the network independently.

For simplicity, the following example limits each node to having only one parent, however, later discussions will expand the algorithms to include the potential for multiple parents. With each node limited to at most a single parent, there are $N^N$ possible network structures that may be evaluated. In the example of FIG. 3 with two nodes, there are four potential dependency structures: node 202 is a parent of node 204 and node 204 is a parent of node 202; node 202 has no parent and node 202 is a parent of node 204; node 204 is a parent of node 202 and node 204 has no parent; and both nodes 202, 204 have no parents.

To determine the structure S* of the Bayesian network of nodes, e.g., the dependencies between the nodes, the possible or potential relationships between a selected child node and potential selected parents may be evaluated independently. The relationship maximizing the probability of the selected structure given the observed child node time series data may be selected. For example, with reference to FIG. 2, a child selector 210 may select one node i from the N nodes of the available nodes in the network system (two in FIG. 2). A potential parent selector 212 may select the possible one or more parents from the available N nodes, excluding the $i^{th}$ node selected as the child node to be evaluated. The strength of the relationship between the selected child node i and the selected potential parent node(s) may be evaluated with a relationship engine 214. For example, the relationship engine may determine the probability of the observed actions (e.g., state changes and/or events) of the selected child node given the actions of the selected parent node(s). This process may be repeated for each potential parent of the selected child, by the potential parent selector selecting a different set of parents for the selected child and the relationship engine determining the strength of that potential relationship. As noted above, the potential parent(s) of a node may include any combination and/or number of nodes in the network system other than the child node itself, and may also include the potential of no parent nodes. A comparison engine 216 may then compare the relationships of each potential parent for a selected child and choose the relationship that maximizes the probability of the selected relationship structure S given the time series $D_i$ of the selected child node. In one example, the relationship system may compare the relationship of no parents to the potential relationships of one or more selected parents. The relationship with the most strength may be retained as the maximal or most suitable parent for the selected child node. The process may then be repeated by returning to the child selector 210 to select the next node i+1 of the system as the selected child and the potential parent selector and comparison engine may determine the maximal parent nodes for that selected child. The maximal parent nodes for each node in the network may define the maximal structure of the network of nodes.

Hazard Rate

The discretization of time in a dynamic Bayesian network, e.g., the time $\Delta$ between actions, may be dependent on the amount of time selected for $\Delta$. For example, a small $\Delta$ value may result in a redundant representation and a large computational overhead; on the other hand, a large $\Delta$ may smooth away important details in the data. To reduce the dependency of the maximal structure S* on the selected time step $\Delta$, the limit of $\Delta$ approaching zero may be considered by introducing a hazard rate. A hazard rate $\lambda(t)$ may specify the inverse average waiting time for the occurrence of an action. For example, a large hazard rate may correspond to a high probability of the action occurring in an infinitely small time interval around time t, and a small hazard rate may correspond to a low probability of the action occurring in an infinitely small time interval around t.

In a homogeneous Poisson process, the inter-arrival time or waiting time of an action, e.g:, state change or event, is distributed exponentially. In this manner, the probability that an action occurs in the time interval from t to and including t+Δ may be expressed as:

$$p(t,\Delta)=1-\exp(-\Delta\lambda(t))$$

Following the geometric distribution, the probability that an action occurs for the first time at d=kΔ may be expressed as:

$$P_\Delta(d) = \frac{\prod_{m=1}^{\frac{d}{\Delta}-1}(1-p(m\Delta,\Delta))p(d,\Delta)}{c(\Delta)}$$

where c(Δ) is a normalization constant, d is a duration of time to event occurrence as a multiple of Δ, and m is a counter related to the number of time steps Δ in the duration d. The generalized exponential distribution may be the limit distribution of the waiting time for an action where the average inverse waiting time at any moment is specified by the integrable function λ. Taking the limit of Δ as it approaches zero, and using l'Hopitals's Rule, the hazard rate may have the following density:

$$\lim\Delta \to 0 P_\Delta(d)/\Delta = GEx(d;\lambda)$$
$$= \frac{\lambda(d)\exp(-\Lambda(d))}{Z[\lambda]}$$

where $$\Lambda(t) = \int_0^d \lambda(x)\,dx$$

and $$Z[\lambda] = 1 - \lim_{d \to +\infty} \exp(-\Lambda(d)).$$

A hazard rate may be introduced for each duration of time between actions of the parent. For example, where the server state data indicates server-up or server-down, an up hazard rate $\lambda_{up}$ may be introduced for the server-up state of the parent and a down hazard rate $\lambda_{down}$ may be introduced for the server-down state of the parent.

To introduce the hazard rates to the network system, the timeline of the selected child node may be partitioned or discretized based on the time series data of the parent node, such as by the relationship engine 214 of FIG. 2. For example, as shown in the example timelines of FIG. 3, the time series data 240 of the child node 204 may be segmented or partitioned into time segment 322 defined by the beginning time $t_0$ and the change in state of the parent node at time 312, time segment 324 defined between the time 312 and the next change in the state of the parent node at time 314, time segment 326 defined by the time 314 of the previous state change and the next state change at time 316, and the like. In this manner, the time series data of the selected child node may be partitioned based on the times of state changes indicated in the time series data of the selected parent node.

A hazard rate λ may be associated with each time segment of the partitioned time line of the child node time series 240. More particularly, an up state hazard rate $\lambda_{up}$ may be associated with time segment 322, a down state hazard rate $\lambda_{down}$ may be associated with the time segment 324, the up state hazard rate $\lambda_{up}$ may be associated with time segment 326 and the like.

The hazard rate $\lambda_{up}$ of the up-state may be considered constant if the state of the parent node does not change. However, the duration of the down-state of the child node may depend on factors other than the parent node, e.g., response time and/or availability of a systems administrator to address a problem, and the like. Accordingly, the down state of the child node may not depend only on the state of the parent. To reduce the complexity due to the down hazard rate $\lambda_{down}$ dependency on external data, the dependency system may be modeled based on the up-times of the child node. In this manner, the up-state hazard rate $\lambda_{up}$ may be associated with the time interval where both the child and parent nodes are up; similarly, the down state hazard rate $\lambda_{down}$ may be associated with the time interval where the child state is up and the parent node is down. Since only the up-times of the child node are modeled, no hazard rates need to be determined for the time intervals where both the child and parent nodes are down, and for the time intervals where the child node is down and the parent node is up. With reference to FIG. 3, an up state hazard rate may be associated with the time segment 322 from $t_0$ to time 312 where the parent node 220 is up, a down state hazard rate may be associated with the time segment 328 from time 312 to time 324 where the parent node is down, and the like.

Piecewise Exponential Distribution

In considering a piece-wise constant hazard rate in the up-state time segments of the selected child node, a number l of constant hazard rates λ may be associated with l sets $T_k$ of non-overlapping intervals T (where k varies from 1 to l) such that the average waiting time in each time interval T in the set $T_k$ is governed by the hazard rate $\lambda_k$. For example, in a two state system, e.g., server up and server down, there are two sets $T_k$ of intervals of T. More particularly, zero or more time intervals T may be in set $T^\uparrow$ of time intervals where the parent node is in an up state, and an up state hazard rate $\lambda_{up}$ may be associated with those time intervals in that set. Similarly, zero or more time intervals T may be in a set $T^\downarrow$ of time intervals where the parent node is in a down state, and a down state hazard rate $\lambda_{down}$ may be associated with those time intervals in that set. As such, each up-time of the child node may be subdivided into non-overlapping intervals $T_{i,k}$ which are selected from an up state interval $T_{i,k}^\uparrow$, a down state interval $T_{i,k}^\downarrow$, and an unknown state interval, $T_{i,k}^?$. For example, as shown in FIG. 3, the up times of the child node 240 may be partitioned into the time segments 322, 328, 330, and the like. Time segment 322 from $t_0$ to time 312 where the parent node 220 is up may be indicated with an up state interval $T_{240,1}^\uparrow$; the time segment 328 from time 312 to time 324 where the parent node is down may be indicated with a down state interval $T_{240,2}^\downarrow$, and time segment 330 from time 320 to time 316 where the parent node is up may be indicated with an up state interval $T_{240,3}^\uparrow$, and the like. In this manner, those time intervals T in the set $T_k$ represent the up state of the child node based on the state of the parent node.

The non-overlapping time intervals T within the sets $T_k$ may be used to define the time segments for different hazard rates which depend on the state of the parent node. For example, the hazard rate may be parameterized with parameter $a_k$ as follows:

$$\lambda(t) = \sum_{k=1}^{l} a_k(t, T_k)\lambda_k = \prod_{k=1}^{l} \lambda_k^{a_k(t,T_k)}$$

since for every time t in the up-state of the child node, there is exactly one $a_k(t)$ which equals one, and the other $a_k(t)$ at that time are zero. More particularly, the $a_k(t)$ are mutually exclusive and cover the time line of the uptime of the selected child node in a non-overlapping manner. Accordingly, the waiting time distribution of a piecewise exponential distribution may have the following density:

$$PEx(d; \lambda, T) = \prod_{k=1}^{l} \lambda_k^{a_k(d,T_k)} \exp(-\lambda_k b_k(d, T_k)) \quad (1)$$

where the expansion parameters $a_k$ and $b_k$ are defined as:

$$a_k(t, T_k) = \sum_{\{t_0,t_1\}\in T_k} I_{t\in[t_0,t_1)} \quad (2)$$

$$b_k(t, T_k) = \sum_{\{t_0,t_1\}\in T_k} (t_1 - t_0)I_{t>t_1} + (t - t_0)I_{t\in[t_0,t_1)} \quad (3)$$

where I is an indicator function.

The above piecewise exponential distribution of the up-time model may provide a conjugate prior with respect to $\lambda$. For example, the belief in the hazard rates may be modeled as a Gamma distribution with the Gamma shape parameters $\alpha$ and $\beta$. In this manner, the density of the product of the Gamma distribution may be defined as follows:

$$pGa(\lambda; \alpha, \beta) = \prod_{k=1}^{l} \frac{\lambda_k^{\alpha_k-1} \exp(-\lambda_k \beta_k)}{Z(\alpha_k, \beta_k)}$$

where $Z(\alpha_k, \beta_k)$ is a normalization constant and may be determined by:

$$Z(\alpha_k, \beta_k) = \frac{\Gamma(\alpha_k)}{\beta_k^{\alpha_k}} \quad (4)$$

Using the definitions of the expansion parameters of $a_k$ and $b_k$ of equations (2) and (3), the following relationships mathematically hold for the duration d or waiting time from one action to another action of the child node:

$$p(d|\lambda) = PEx(d; \lambda, T) \quad (5)$$
$$p(\lambda) = PGa(\lambda; \alpha, \beta)$$
$$p(\lambda|d) = PGa(\lambda; \alpha + a(d, T), \beta + b(d, T))$$
$$p(d) = \prod_{k=1}^{l} Z(\alpha_k + a_k(d, T_k), \beta_k + b_k(d, T_k))$$

More particularly, since $p(\lambda|d) \propto p(d|\lambda)p(\lambda)$ is a function of the hazard rate vector $\lambda$, the update equations for $\alpha$ and $\beta$ follow directly from equations (2) and (3) above. More particularly, the distribution p(d) may be determined by:

$$p(d) = \int p(d,\lambda)d\lambda = \int p(d|\lambda)p(\lambda)d\lambda$$

which incorporates the hazard rates into the determination of the normalization function $Z(\alpha,\beta)$. The normalization constant Z is simply the probability of the duration d, e.g., p(d) whose form follows that of the density of the product of the Gamma distribution of equation (4). As noted above, the duration $d_{i,k}$ equals $t_{i,k+1} - t_{i,k}$.

Based on the equations defined above, the optimal or maximum probability network structure S* of the nodes may be formulated based on the data-dependent terms of the probability of the observed data of the child node given the parent node time series data $P(D_i|D_j)$, and the probability of the child node time series data $P(D_i)$.

Applying the determined intervals $T_{i,k}$ of the sets $T_i^\uparrow$, $T_i^\downarrow$, $T_i^?$ of the up state of the child node to equation (5) for the probability of the duration, the probability of the observed data of the child node $D_i$ with and without parents may be determined. These determinations incorporate Occam's razor by constraining the $a_k$ and $b_k$ functions such that:

$$\sum_{u\in\uparrow,\downarrow,?} a_u(d_{i,k}, T_{i,k}^u) = 1$$

$$\sum_{u\in\uparrow,\downarrow,?} b_u(d_{i,k}, T_{i,k}^u) = d_{i,k}$$

In this manner, the probability of the observed data of the child node $D_i$ without any parent node may be determined as follows:

$$P(D_i) = Z\left(\alpha + n_i, \beta + \sum_{k=1}^{n_i} d_{i,k}\right) \quad (6)$$

where Z is defined by equation (4) and $n_i$ is the number of up-time intervals for the selected child node.

Similarly, the probability of the observed data of the child node $D_i$ given the time series data of the parent node $D_j$ may be determined as follows:

$$P(D_i | D_j) = \prod_{u\in\uparrow,\downarrow,?} Z\left(\alpha_u + \sum_{k=1}^{n_i} a_u(d_{i,k}, T_{i,k}^u), \beta_u + \sum_{k=1}^{n_i} b_u(d_{i,k}, T_{i,k}^u)\right) \quad (7)$$

Parameter Estimation

To set the parameters of $\alpha$, $\beta$ where the child has no parent and the parameters $\alpha_u$, $\beta_u$ (where $u\in\{\uparrow,\downarrow,?\}$) where the child node has a parent, an expert in the components providing the child node time series data may be consulted to determine the mean $\mu$ and variance $\sigma^2$ of the up-times or other relevant actions of the time series data given the potential parent relationships or no parent relationships. The shape parameters $\alpha$ and $\beta$ of the Gamma distribution may be determined as a function of the mean $\mu$ and variance $\sigma^2$. To incorporate the skew of the Gamma distribution, the prior may be specified in terms of the upper and lower quantiles $q_u$ and $q_1$, respectively. For example, the upper and lower quantiles may be determined by the upper 1-15 percent and the lower 1-15 percent of the up-time Gamma distribution. The shape parameters α and β may be obtained by any suitable non-linear function determination technique such as Newton-Raphson techniques. More particularly, in one example, an expert may estimate that the usual up-time for a server without a parent as 5-30 days. Thus, the Gamma distribution may allocate be 10% to be below 5 days and 10% to be above 10 days. The upper and lower 10% quantiles of the expert estimated up-time of a server having no parents may be used to determine the shape parameters α and β. This estimation may be repeated for each estimated parameter, e.g., the upper and lower 10% quantiles of the expert estimated up-time for a server having a parent in the up-state may be used to determine the shape parameters $\alpha_\uparrow$ and $\alpha_\uparrow$, and the like. It is to be appreciated that any suitable method or technique may be used to determine the shape parameters of the Gamma distributions.

Assuming that the selected child node and selected parent node are related in the suggested manner when choosing the prior parameters of α, β, of the child node without a parent node, and the prior parameters of the different up, down and unknown states of the selected parent node, e.g., $\alpha_\uparrow$, $\beta_\uparrow$, $\alpha_\downarrow$, $\beta_\downarrow$, $\alpha_?$, and $\beta_?$, may introduce a bias to the above determined distributions of the child node time series data. This accuracy may be represented as an odds ratio given by:

$$O_{i,j} = \prod_u \frac{Z(\alpha_u, \beta_u)}{Z(\alpha, \beta)} \quad (8)$$

where $$\prod_u Z(\alpha_u, \beta_u)$$

represents the prior probability that node j is the parent of node i, and Z(α,β) represents the prior probability that node i has no parent, e.g., the parent of node i is the empty set. In this manner, the relationship of the selected parent and the selected child may be evaluated against the relationship of the selected child node having no parent by the comparison:

$$\frac{1}{O_{i,j}} \frac{P(D_i \mid D_j)}{P(D_i)} \geq 1$$

If the given ratio exceeds the value of 1, then the relationship between the selected child and selected parent nodes are more likely than the child node having no parents. As shown in FIG. 2, the determined relationship distribution 254 may be sent from the relationship engine 214 to the comparison engine 216 to be compared to the relationship determination of the selected child with no parent, or as discussed further below, with the relationship the selected child as dependency from another selected parent.

As noted above, a parent selector may select another potential parent for the selected child, and compare that to the greater of the previous relationship comparison, e.g., the greater of ($P(D_i|D_j)$) and $P(D_i)$. In this manner, the maximal relationship for that selected child node may be determined. The child selector may then select the next node as a potential child node and repeat the above cycle to determine the maximal parent relationship for that child node alone or given the time series data of each potential parent node. In this manner, the network structure may be determined by determining the maximal parent node(s) for each child node in the network system.

Event Based Time Series Data

As noted above, the time series data 220, 240 shown in the dependency system of FIG. 2, may be event-based, rather than state-based. For example, the time series data may comprise a list of event occurrences at logged times of those events. Logged events may be point processes such as spike train recordings, file access patterns, failure events, and the like in server farms, queuing networks, operating system software and the like.

The time to an event may be modeled as an inhomogeneous Poisson process obtained in terms of hazard rates which depend on the events of the time series data up to the time of the event occurrence. The hazard rate function may depend on the history of the time series data in a time window extending a predetermined time into the past, the hazard rate function may depend on the relationship of that node to its parent nodes and its time series, and may be parameterized by a generalized linear model.

In the prior art, the timeline of the events of a selected parent node is partitioned into intervals of a fixed length, and transforming the time series event data into a count of events occurring in that fixed time interval. The dependency structure of such a network is known as a dynamic Bayesian network, discussed above. However, as noted above, the dependency on the selected length of the fixed time interval may create a large overhead if too small, or smooth away important details if too large.

To reduce the dependency on the pre-determined length of the time interval, the limit of time interval as it approaches zero may be determined to model the waiting time in each time series directly. For example, the time interval window may be shifted over the timeline of the selected parent node, with the event count changing at the time points where new events enter or leave the window. The count of events of the parent node may be analogized to a state of the parent node, e.g., zero events may be one state, one counted event may be another state, and the like.

Figure 5:
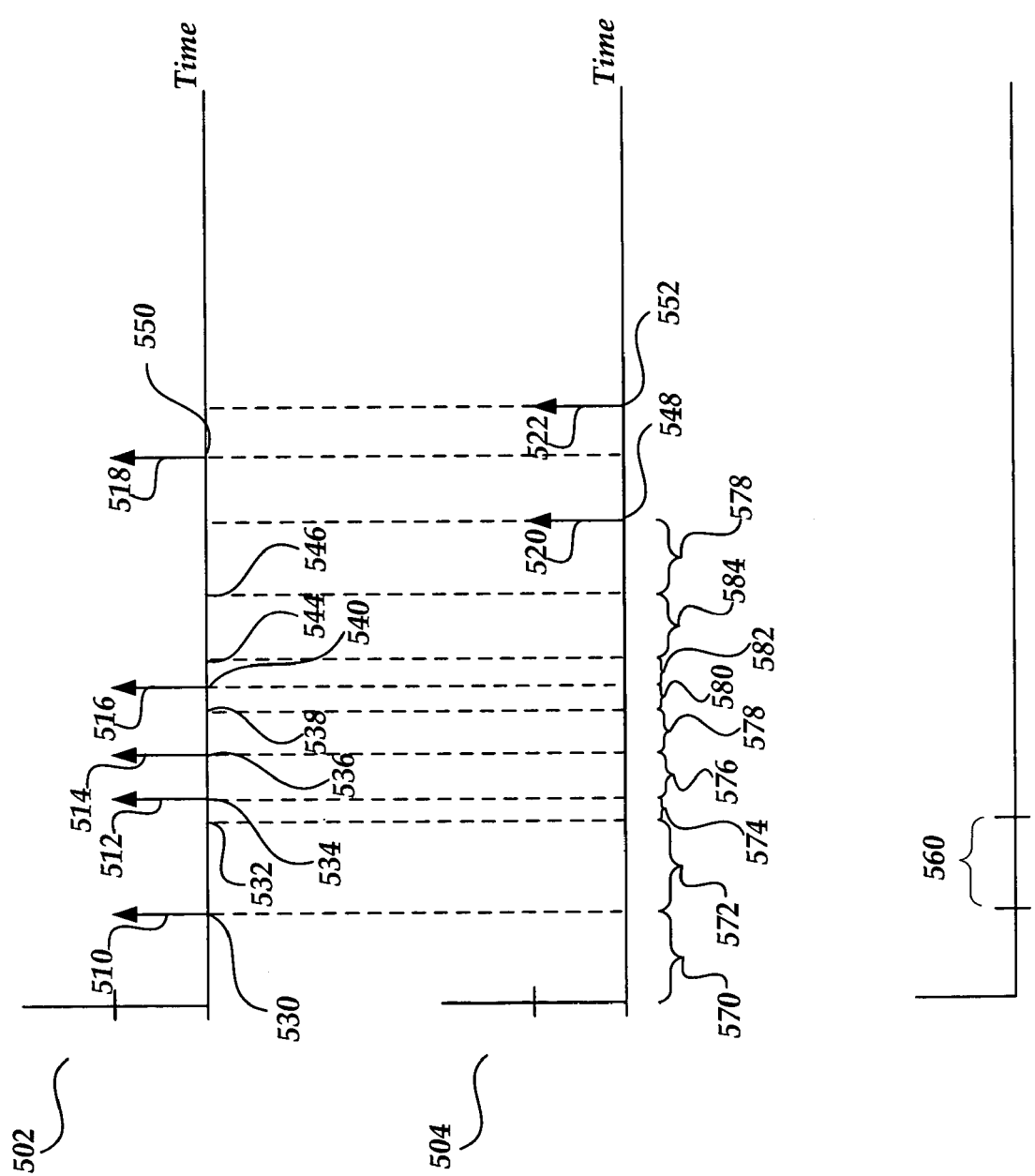
FIG. 5 is a timeline showing example time series event data of two components.

FIG. 5 illustrates example timelines of a selected parent node 502 and a selected child node 504, which each timeline containing event data occurring at an indicated time. The events are illustrated in FIG. 5 as arrows 510, 512, 514, 516, 518, 520, 522 occurring at an instant in time 530, 534, 536, 540, 548, 550, 552 respectively. The shifting time window 560 may be any suitable length of time based on many factors including, the components providing the time series data, the amount of observed time series data, and the like. In the example of FIG. 5, the event count of time series data 502 from time zero the time 530, e.g., time segment 570, is zero. The event count from time 530 to time 532, time segment 572, is one based on the event 510. Time segment 574 from time 532 to time 534 is zero since event 510 occurs before the extent of time window 560. Time segment 576 from time 534 to time 536 has an event count of one since time window 560 includes event 512. Time segment 578 from time 536 to time 538 has an event count of two including events 512 and 514. Time segment 580 from time 538 to time 540 has an event count of one since event 512 is no longer within the reach of time window 560. Time segment 582 from time 540 to time 544 has an event count of two including event 514 and event 516. At time 544, event 514 is beyond the reach of time window 560, and accordingly, time segment 584 from time 544 to time 546 has an event count of one, e.g., event 516. At time 546, event 516 leaves the extent of time window 560 in the past and thus, the event count of time segment 586 from time 546 to time 550 is zero. The event counts associated with the time segments may be analogized as 'states' of the parent system. Thus, the system of FIG. 5 above would have three states, e.g., event count values of zero, one, and two, in addition to an 'unknown' state, each of which is associated with a time segment of the child node time series data.

As with the state time series data discussed above, the dependency of a selected child node i on the selected parent node j may be modeled by the hazard rates $\lambda(t)$ of the child node. In the state based time series data, the hazard rates were a function of the state of the parent node. Similarly with event based time series data, the hazard rate may be a function of the event counts of the selected parent node(s) in the time window of length $\omega$, e.g., time window 560 shown in FIG. 5, where $n_i(t)$ represents the series $n_{i,p1}(t), \ldots, n_{i,pm}(t)$ where $n_{i,pj}(t)$ is the count of events of parent node $p_j$ in the time window $[t-\phi,t)$, where there are m selected parent nodes.

A generalized linear model for the rate function $\lambda(t)$ may be determined in terms of the counts $n_i(t)$. Any suitable link function may be used such as a probit or sigmoid function which exhibit a natural saturation characteristic. Another suitable link function may be the canonical link function for the Poisson model, i.e., an exponential weighting function, which results in a hazard rate of:

$$\lambda_i(t; w_i, x_i) = \exp\left(w_{i,0} + \sum_{j=1}^{m} w_{i,j} x_{i,j}(t)\right) \quad (9)$$

where the parent node j is from the selected parent node(s) of 1 through m, and $w_{i,0}$ represents a bias term and translates into a multiplication base rate $\exp(w_{i,0})$. The weighting parameter $w_{i,j}$ represents the influence of the event count of parent node j on the child node i. The expansion term $x_{i,j}(t)$ defined as:

$$x_{ij}(t) = \ln(1 + \hat{\lambda}_{i,j}(t))$$

$$\hat{\lambda}_{i,j}(t) = \frac{n_{i,j}(t)}{\varphi}$$

The parameter $\hat{\lambda}_{i,j}(t)$ is the empirical rate of parent node j with respect to node i.

The rate function $\lambda(t)$ may be rewritten to reduce inference or prediction calculations, as follows:

$$\lambda_i(t) = \exp(w_{i,0}) \prod_{j=1}^{m} (1 + \hat{\lambda}_{i,j}(t))^{w_{i,j}}$$

In this manner, a positive value for $w_{i,j}$ may indicate an excitatory effect and a negative value for $w_{i,j}$ may correspond to an inhibitory effect on the hazard rate. Accordingly, the hazard rate of each child node at any given time instant is a function of the empirical rate $\hat{\lambda}_{i,j}(t)$ of the parent node(s), e.g., the event count of the parent nodes in the dynamic window $\phi$, which results in an inhomogeneous Poisson process. Due to the finite length of the time window $\phi$, there may be a finite number of different count vectors of a parent node. The piecewise constant characteristic of the hazard rate is attributable to the piecewise constant behavior of the count vector $n_i(t)$ which is caused by the finiteness of the time window $\phi$.

Likelihood of Relationship

Like the state-based model above, the hazard rate for event-based time series data has a piecewise constant characteristic, e.g., the hazard rate is constant where the state or event count of the parent is constant. If there is only one selected parent node and the parent node has a maximum event count of one in any given time window $\phi$, then the parent node would only have two states, e.g., event count of zero and event count of one, in addition to a possible unknown state. Accordingly, the dependency system may be exactly determined as discussed above with respect to the two state system, e.g., server up and server down, and using equations (6), (7), and (8).

However, the event count may exceed one, and in this manner, more than two states representing event counts in time window of $\phi$ may be modeled. In a similar case, the parent node comprising state based time series data may have more than two states. Accordingly, the probability distribution of the child node time series given time series data of the parent node may be approximated. Although the following example is given with respect to event count data, it is to be appreciated that multiple states of a parent node may be resolved in a similar manner.

To estimate the probability of the time series data corresponding to a given node, the $l-1^{th}$ and $l^{th}$ events (or time of state change) may occur at times $t_{l-1}$ and $t_l$ respectively in a given child node. The instants of time at which the count vector changes in this interval may be represented as $\breve{T}_{l,1}, \ldots, \breve{T}_{l,k}$. With reference to FIG. 5, time $t_{l-1}$ may be $t_0$, time $t_l$ may be time 548 for event 520, and the interval time $\breve{T}_{l,1}$ may be time 530, interval time $\breve{T}_{l,2}$ may be time 532, interval time $\breve{T}_{l,3}$ may be time 534, . . . interval time $\breve{T}_{l,9}$ may be time 548, and the like.

The probability density of an event occurring at time $t_l$ given that the previous event of the child node happened at $t_{l-1}$ may be denoted as $p(t_l|t_{l-1},w,S)$. Due to the piecewise constant characteristic of the hazard rates, its density may be a product of probabilities of non-occurrence of an event in each of the disjoint subintervals from the last event occurrence at $t_{l-1}$ to $\breve{T}_{l,k}$, and the probability that the event occurs at time $t_l$ in the interval $(\breve{T}_{l,k}, t_l]$, e.g., time segment 584 of FIG. 5. The disjoint subintervals of non-occurrence include time intervals $(t_{l-1}, \breve{T}_{l,1}], (\breve{T}i_{l,1}, \breve{T}_{l,2}], \ldots, (\breve{T}_{l,k-1}, \breve{T}_{l,k}]$ which as shown in FIG. 5, are the segments 570, 572, 574, and the like. Accordingly, the probability density of an event occurrence at $t_l$ given a previous event at time may be $t_{l-1}$ defined as:

$$p(t_l \mid t_{l-1}, w, S) = \lambda_{l,k+1} \left( \prod_{j=1}^{k+1} \exp(-\lambda_{l,j} \tau_{l,j}) \right)$$

where $\lambda_{l,j}$ is the hazard rate as in equation (9) above for a node which is a function of the event counts of its parents in the $j^{th}$ subinterval corresponding to the $l^{th}$ event, and the duration of the time segment $\tau_{l,j}$ is defined by:

$$\tau_{l,1} = \breve{T}_{l,1} - t_{l-1}$$

$$\tau_{l,j} = \breve{T}_{l,j} - \breve{T}_{l,j-1} \text{ where } 2 \leq j \leq k$$

$$\tau_{l,k+1} = t_l - \breve{T}_{l,k}$$

In this manner, the probability density for the time data series $D_i$ comprising a time series of events at times $[t_1, \ldots, t_N]$ of a selected child node may be obtained as the product of the probability densities for each mutually exclusive subinterval $(t_0, t_1], \ldots, (t_{N-1}, t_N]$ as follows:

$$p(t \mid \dot{w}, S) = \prod_{l=1}^{N} p(t_l \mid t_{l-1}, w, S) \qquad (10)$$

$$= \prod_{l=1}^{N} \left( \exp(-\lambda_{l,1} \tau_{l,1}) \left( \prod_{j=1}^{k_l-1} \exp(-\lambda_{l,j+1} \tau_{l,j+1}) \right) \right)$$

$$\prod_{l=1}^{N} (\lambda_{l,k_l+1} \exp(-\lambda_{l,k_l+1} \tau_{l,k_l+1}))$$

Sampling

The structure of the network may be used to perform sampling in an efficient manner. To determine the sampling time of the events provided by a node, the Poisson network described above may be exactly sampled in some cases due to the piecewise constant behavior of the hazard rate function $\lambda(t)$ and the absence of cycles in the network. For example, in a single node network, the time series data is a homogeneous Poisson process, and thus, sampling may make use of the property that the waiting times between two adjacent events are independently and identically distributed, and are distributed exponentially with the hazard rate parameter $\lambda$. In a two node network, where there is a single parent node with a single child node, sampling for the parent node may be accomplished in the manner of a single node network because at any given time, the parent node events are independent of the child node. The hazard rate function for the child node may be calculated using equation (9) above once the whole time series for the parent node is known. The hazard rate function for the child node is piecewise constant because there are a finite number of events of the parent node in the time window $[t-\phi,t]$ for varying times t. Sampling from a waiting time distribution with a piecewise constant rate function may be done by rejection sampling. For example, the current value of the hazard rate function $\lambda(t)$ may be assumed to remain unchanged until time t'. The time window $\tau$ maybe sampled from the waiting time distribution with parameter $\lambda(t)$. The time window $\tau$ may be accepted if $t+\tau \leq t'$ and rejected otherwise. The sampling time may be updated to t' or $t+\tau$ depending on whether the sample is rejected or accepted, respectively.

If the node network has two nodes, with each node being a child and parent to the other node, there exists a cyclic relationship between the two nodes. In this manner, each node depends on the event counts in the past of the other node. Sampling from the nodes may not be done in an independent manner due to the cyclic relationship. To determine the sample rate, the hazard rate $\lambda_1(t)$ of the first node and the hazard rate $\lambda_2(t)$ of the second node may be initially calculated with equation (9) above. It may be assumed that both hazard rates remain constant until $t'_1, t'_2$ excluding the mutual interaction in the future. The waiting times $\tau_1$ and $\tau_2$ may be sampled for both nodes using the calculated rates $\lambda_1(t)$ and $\lambda_2(t)$, respectively. The sample corresponding to the maximum of $\tau_1$ and $\tau_2$ may be rejected because an earlier event at the other node might have changed the value of the rate function. In this manner, the lower sample of $\tau_1$ and $\tau_2$ is accepted if it is within the constant time interval of the hazard rate. The sampling time may be updated to the minimum of $t'_1, t'_2$ or t plus the minimum of $\tau_1$ and $\tau_2$ depending on whether the other sample was rejected or accepted, respectively.

The two node cyclic network sampling technique may be generalized to an arbitrary number of nodes considering that certain groups of nodes have to be sampled in a synchronized, dependent way because of mutual dependence and may have to be done in a certain order. For example, some groups of nodes may be strongly connected components. A strongly connected component is a directed subgraph with the property that for all ordered pairs of vertices in the subgraph, there exists a path between the vertices. A variant of depth first search can be used to find the strongly connected components of a graph. A directed acyclic graph may be obtained by replacing each strongly connected component pair with a single meta-node. In this manner, the nodes of the directed acyclic graph can be sampled from in such a way that, when sampling a node, its parents have been sampled before. Any suitable method or technique may be used to efficiently order the sampling, such as topological sorting as described by Corman, et al., "Introduction to Algorithms," 2nd ed., MIT Press, 2001.

Figure 4:
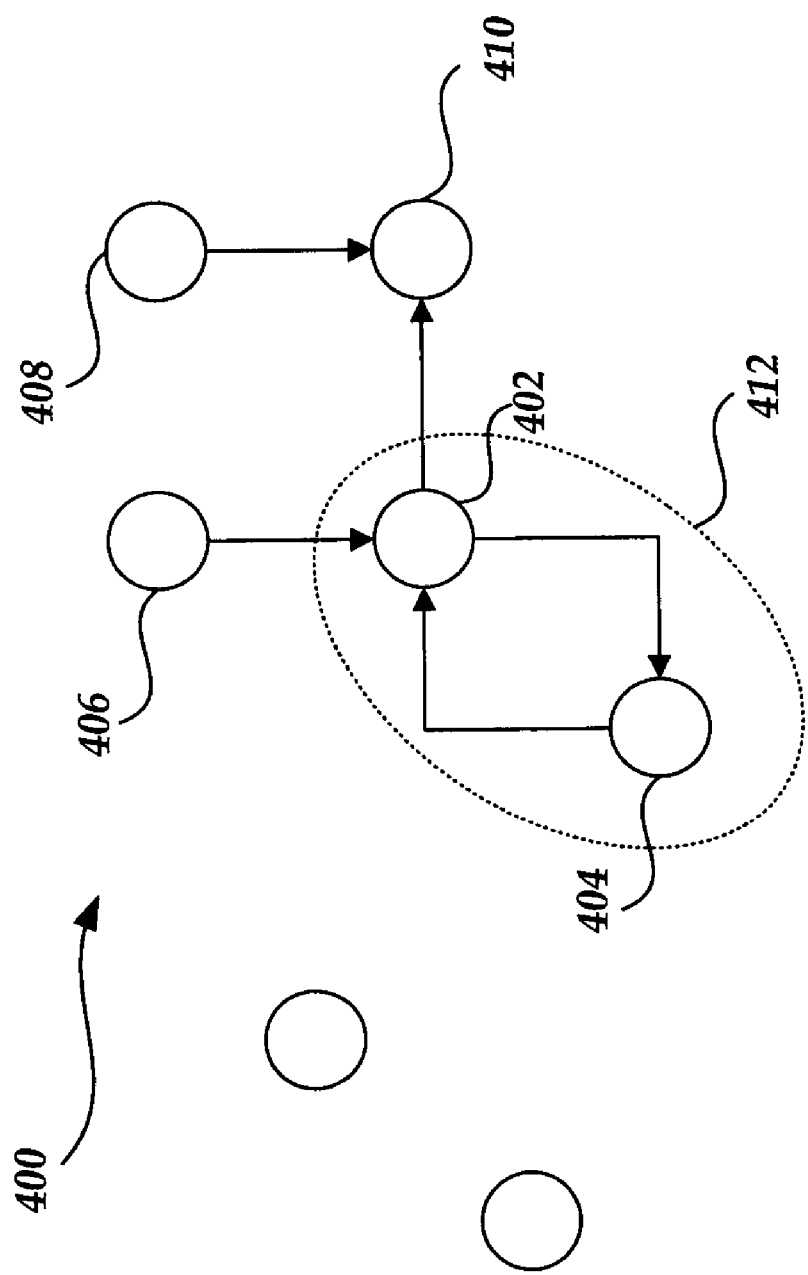
FIG. 4 is an example display of a determined dependency structure of related nodes.

For example, the dependency system of display 400 of FIG. 4 illustrates a strongly connected component of nodes 402, 404. The node network system may be transformed into a directed acyclic graph with a node 412 representing the strongly connected component of nodes 402, 404. In this example, topological ordering may indicate that node 406 and node 408 should be sampled first. Moreover, nodes 406, 408 may be sampled independently of each other, and thus, may be accomplished in parallel. Node 412 may be sampled and then node 410 may be sampled.

Determine Relationship

To find the most plausible structure S* based on the observed time series data of the parent and child, the weighting parameter w of the linear model of equation (9) may be estimated. The weighting parameter w may be estimated in any suitable manner which may also provide a marginalized likelihood or score over the selected structure S. Rather than the Gamma distribution of the two state example discussed above, a Gaussian prior distribution over the weights may be chosen as follows:

$$p(W|S) = \Pi_i N(w_i; 0, \sigma^2 I)$$

where W is the matrix of parameters for the system of nodes, N is a Gaussian distribution having a mean of zero and a covariance of $\sigma^2 I$. The variance $\sigma^2$ may be initialized to any suitable value such as one. Using Bayes rule, the posterior may be as follows:

$$p(W \mid D, S) = \frac{p(D \mid W, S) p(W, S)}{p(D \mid S)}$$

where D is the matrix of time series data for the nodes in the system. The structure of the Bayesian learning may be as follows:

$$S^* = \mathrm{argmax}_S p(S|D)$$

$$p(D \mid S) = \prod_{i=1}^{V} p(t_i \mid t_j)$$

where j is a selected parent of node i as specified in S $$p(S) = \prod_{i=1}^{V} p(|\text{parents of } i|)$$

where the structural prior p(S) factors the parents of the V nodes in the system, and $p(t_i|t_j)$ is equation (10) above marginalized over w.

As noted above, the relationship engine 214 of FIG. 2 may estimate and/or score the relationship between the selected child node and the selected parent node. The score of the relationship may be based on the probability $(p(D_i|n,\phi,S))$, of the time series data $D_i$ given the assumed structure S, the event counts of the selected parent n(t), and the selected time segment window $\phi$. The determined strength of the relationship, e.g., $(p(D_i|n,\phi,S))$, may be found by approximating $p(D_i,w|n,\phi,S)$ as a function of $D_i$ where the normalizing constant corresponds to the strength of the selected relationship $p(D_i|n,\phi,S)$. As with the state-based time series data, the score of a relationship between a selected child and parent node may be determined by a normalization constant.

In some cases, optimization and approximation of the network may not be constrained to optimize over the set of directed acyclic graphs since in this example it is a Poisson network and a continuous time Bayesian network. In this manner, the learning problem may be solved by finding the most likely parents of each node independently. As noted above, any number of parents may be learned for each child node, however, learning time may be reduced by limiting the number of parents of a node to a predetermined number of most likely parents. In another example of estimating the structure for the network system, the most likely parents for each node may be determined independently of the other nodes.

The most likely parents for each child node may be determined in any suitable manner, such as through maximum likelihood/maximum a posterior estimates, Laplace approximation, variational inference, expectation propagation, and the like. The following examples are described with respect to the exponential weighting function for modeling the influence of a parent on its children given by equation (9). However, it is to be appreciated that the following examples may be extended to any other differentiable function for the hazard rate.

The parameters to be estimated include the weights $w_{i,j}$ and the time window duration $\phi_{i,j}$. In many cases, estimation of the time window duration $\phi_{i,j}$ may be computationally extensive. Thus, to reduce computational burden, the time window duration $\phi_{i,j}$ may be estimated by discretizing the space of the window durations based on expert knowledge. The time window duration $\phi_{i,j}$, e.g., window 560 of FIG. 5, may be chosen from the computed window durations which has the highest evidence. In some cases, the time window duration $\phi$ may have a length of any positive value, such as 1 second.

Maximum Likelihood/Maximum a Posterior Estimation

Maximum likelihood and maximum a posterior estimates may be used to approximate the parameters w for the network. Based on the probability of the child node time series data based on the event count, parameters, time window duration, and selected structure given by equation (10) above, the maximum likelihood estimates for the weight vector w may be provided as follows:

$$w_{ML} = \arg\max_w[\log(p(D_i|n,w,S))]$$

and the log-likelihood may have the following form:

$$\log(p(D_i|n,w,\varphi,S)) = \sum_{l=1}^{N}(w^T n_{l,k_l+1}) - \sum_{l=1}^{N}\sum_{j=0}^{k_l}(\exp(w^T n_{l,j+1})\tau_{l,j+1})$$

In this manner, the gradient of the log-likelihood with respect to w may be as follows:

$$\nabla_w \log(p(D_i|n,w,\varphi,S)) = \sum_{l=1}^{N}(n_{l,k_l+1}) + \sum_{l=1}^{N}\sum_{j=0}^{k_l}(\exp(w^T n_{l,j+1})n_{l,j+1}\tau_{l,j+1})$$

where gradient descent optimization can be used to obtain the maximum likelihood estimate of $w_{ML}$. It is to be appreciated that any suitable optimization may be used.

With a Bayesian approach, the a priori knowledge of the system may be used to estimate the parameters. The prior distribution may be chosen over the weights p(w|S) to be an isotropic Gaussian $N(w;0,\sigma^2 I)$. Using Bayes rule, the posterior of the parameters may be as follows:

$$p(w|D_i,n,\varphi,S) = \frac{p(D_i|n,w,\varphi,S)p(w|S)}{p(D_i,n,\varphi,S)}$$

The maximum a posterior estimate of the parameters may be as follows:

$$w_{MAP} = \arg\max_w \log(p(D_i|n,w,\varphi,S)) + \log(p(w|S))$$

$$= \arg\max_w\left[\sum_{l=1}^{N}(w^T n_{l,k+1}) - \sum_{l=1}^{N}\sum_{j=0}^{k_l}(\exp(w^T n_{l,j+1}))\right] - \left[\frac{\dim(w)}{2}\log(2\pi) - \log(\sigma_w) - \frac{1}{2\sigma_w^2}(w^T w)\right]$$

where the first bracketed term is the log-likelihood and the second bracketed term is the log-prior. By calculating the gradient of the above with respect to w, the maximum a posteriori estimate may be obtained by applying gradient descent using the gradient given by:

$$\nabla_w \log(p(D_i,w|n,\varphi,S)) =$$

$$\sum_{l=1}^{N}(n_{l,k_l+1}) - \sum_{l=1}^{N}\sum_{j=0}^{k_l}(\exp(w^T n_{l,j+1})n_{l,j+1}\tau_{l,j+1}) - \frac{1}{\sigma_w^2}w$$

Laplace Approximation

Laplace approximations of Bayes networks are discussed generally in Kass et al., "Bayes factors," J. Am. Statistical Soc'y, vol. 90, 1995, pp. 773-795. In a Laplace approximation, the posterior is approximated by a multivariate Gaussian density given by:

$$P(w_i|D,S) \approx N(w_i;w_{MAP},\Sigma)$$

where $w_{MAP}$ is the mode of the posterior described above in maximum a posterior estimation and given by:

$$w_{MAP} = \arg\max\ w_i p(D_i,w_i|S)$$

and the covariance matrix $\Sigma$ is given by:

$$\sum = \left(-\nabla \nabla_{w_i}^T \ln(p(D_i, w_i|S)|_{w=w_{MAP}}\right)^{-1}$$
$$= -H(\ln(p(D_i, w_i|S)))^{-1}$$

where H(.) is the Hessian operator. For this example, the Hessian may be expressed as:

$$H(\ln(p(D_i,w_i|S))) = -\Sigma(\exp(w^T n_{l,j+1}) n_{l,j+1} n_{l,j+1}^T \tau_{l,j+1}) - 1/\sigma_w^2$$

In this manner, the probability of the observed data of the child $D_i$ given the structure, event counts, and time windows may be approximated by:

$$\log(p(D_i|n,\phi S)) = \log(p(D_i,w_{MAP}|n,\phi,S)) + \frac{1}{2}\dim(w)\log(2\pi) + \frac{1}{2}\log(|\Sigma|)$$

where the mode $w_{MAP}$ may be found by the conjugate gradients algorithm using the gradient of $\ln(p(D_i,w_i|S))$ with respect to w. It is to be appreciated that any suitable non-linear optimization may be used rather than the conjugate gradients algorithm.

Variational Inference

A variational approach to solving problems of parameter estimation and structure learning introduces a family of probability distributions $q_\theta(w_i)$ parameterized over $\theta$ which gives rise to a lower bound on the marginalized likelihood given by:

$$\ln(p(D_i|S)) \geq L_M(\theta)$$

where $$L_M(\theta) = \left\langle \ln\left(\frac{p(w_i|S)}{q_\theta(w_i)}\right) \right\rangle_{q_\theta} + \langle \ln(p(D_i|w_i,S)) \rangle_{q_\theta}$$

where $\langle f(.) \rangle_q$ indicates an expectation of the function $f(.)$ with respect to the distribution q. The lower bound follows from an application of Jensen's inequality to the concave logarithm function. The lower bound L on the log-marginal probability is a function of the parameters $\theta$ of the distribution q. This bound is tight if $q_\theta(w_i)$ is chosen to be the true posterior $p(w_i|D_i,S)$. The lower bound $L_M$ is the sum of two terms here the first term corresponds to the negative of the Kullback-Leibler (KL) divergence between the prior term and the distribution $q_\theta(w_i)$ and the second term is the log-likelihood of the data averaged over $q_\theta(w_i)$.

A variational approximation Bayesian algorithm maximizes the lower bound $L_M$ with respect to the parameters of the q distribution. The structure learning problem can be posed as maximization of the lower bound $L_M(\theta)$ which can be written as:

$$S^* = \arg\max_M[\max_\theta L_M(\theta)]$$

Similar to the Laplace approximation, $q_\theta(w_i)$ may be chosen as a multivariate Gaussian $N(w_i;\mu,\Sigma)$. For a given network structure S, the conjugate gradients may be used to find the maximum of the lower bound $L_M(\mu,\Sigma)$ where the gradients are given by:

$$\nabla_\mu\left(L_M\left(\mu, \sum\right)\right) = $$
$$-\mu + \sum_{i=1}^N x_{i,k_l} \ldots - \sum_{i=1}^N \sum_{j=1}^{k_l} \tau_{i,j} x_{i,j} \exp\left(\frac{x_{i,j}^T \sum x_{i,j} + 2\mu^T x_{i,j}}{2}\right)$$

-continued $$\nabla_\Sigma\left(L_M\left(\mu, \sum\right)\right) = -\frac{1}{2\sigma^2}I + \frac{1}{2}(\sum)^{-T} \ldots - \sum_{i=1}^N \sum_{j=1}^{k_l} \frac{1}{2} \tau_{i,j} x_{i,j} x_{i,j}^T \exp\left(\frac{x_{i,j}^T \sum x_{i,j} + 2\mu^T x_{i,j}}{2}\right)$$

Resolution of the above equations (e.g., MAP, Laplace, variational inference) may be determined by the relationship engine 214 of FIG. 2 to determine the relationship between the selected child and the selected parent node(s). The relationship 254 may be passed to a comparison engine 216 to determine the most likely or strongest relationship with a selected parent. By determining the most likely or strongest parents for each child node, the structure of the node network system 256 may be determined.

Multi-State and/or Multi-Parent Time Series Data

Figure 6:
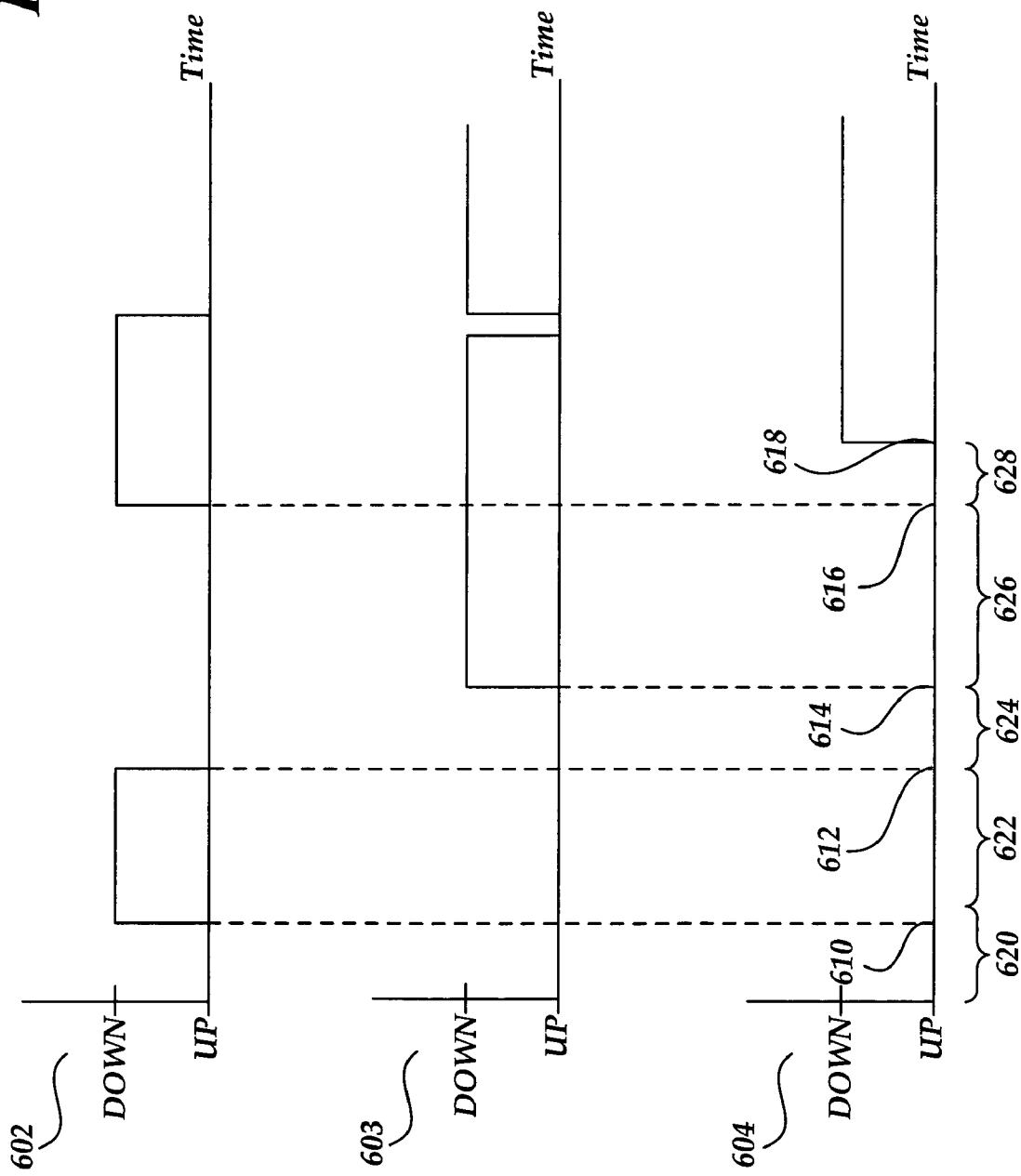
FIG. 6 is a timeline showing example time series state data of three components.

The above equations for the event count states may also be used to determine a three or more state-based system and/or combination of event and state-based system. Moreover, the above approximations may be used to approximate a state and/or event-based time series data node system where more than two parents are allowed for each child node. For example, as shown in the example time series state data of FIG. 6, the selected child node 604 has two selected parent nodes 602, 603. The hazard rates for the child node 604 may be chosen to indicate the separate up and down states of the two parents during the up state of the child node. More particularly, the time segment 620 from time $t_0$ to time 610 may be modeled with a constant hazard rate $\lambda_{up,up}$ representing the up states of the two parent nodes 602, 603. The time segment 622 from time 610 to time 612 may be modeled with a constant hazard rate $\lambda_{down,up}$ representing the down state of parent node 602 and the up state of the parent node 603. The time segment 624 from time 612 to time 614 may be modeled with the constant hazard rate $\lambda_{up,up}$ representing the up states of both parent nodes 602, 603. The time segment 626 from time 614 to time 616 may be modeled with a constant hazard rate $\lambda_{up,down}$ representing the up state of parent node 602 and the down state of parent node 603. The time segment 628 from time 616 to time 618 may be modeled with a constant hazard rate $\lambda_{down,down}$ representing the down states of both parent nodes 602, 603 during the up state of the child node 604. The multiple hazard rates, in this example four different hazard rates, may be approximated in a manner similar to the multiple hazard rates of the event time series data described above.

In some cases of multiple parent cases, heuristic and/or expert data may be used to limit the parental combinations tested as potential relationships with a selected child node. For example, there may be an assumption that a child node is strongly correlated with two or three parent nodes. In this example, the different combinations of the two or three parent nodes may be tested and the strongest relationship may be selected.

Display of Dependency Structure

When the relationship engine has determined the maximal parental nodes for each child node, the structure 256 of the network system may be passed to a display engine 258, as shown in the example dependency system of FIG. 2. The nodes of the system may be displayed as any suitable icon, such as a circle, square, component identifier shape, and the like. As shown in FIG. 4, the dependency structure display 400 may illustrate the nodes as circles. The component associated with a node may be identified in any suitable manner, such as shape, color, text within or associated with the displayed node, such as with a pop up text box when a cursor hovers over the node. The relationships between the nodes of the system may be displayed in any suitable manner, such as proximity of the nodes, hierarchical placement of the nodes, directed connectors such as arrows showing directionality of the relationship, popup text boxes describing the inter-relationships when a cursor hovers over the node, and the like. The nodes without determined parents may be displayed in a particular area of the display, shown without dependency relationships, shown in a pre-determined color and/or shape, or in any other suitable manner. The strength of the relationship may be illustrated in any suitable manner such as color and/or type of connector between nodes, thickness of the connector between the nodes, length of the connector between related nodes, a pop up text box describing the posterior probability of the relationship as provided by the relationship engine, and the like. A systems administrator or other user may explore the determined relationships and/or strength of relationships to examine weaknesses of the system, and the like.

Prediction

When the dependency structure of the node network system is determined, the determined relationships and strength of relationships may be used to predict the actions of the child node based on observed time series data of the parent node. For example, as shown in FIG. 2, a predictor engine 260 may receive the dependency structure 256 from the comparison engine that defines the relationships between given nodes of the determined system. The predictor engine may then receive further time series data from one or more of the parent nodes in the dependency system. The received time series data may be used to predict or estimate the behavior, e.g., state or event, of the indicated child node, or query node. For example, a server in a server farm may go into a 'down state.' Using the determined relationships and strength of the relationships, the predictor engine may indicate which other servers, e.g., child nodes, of the given parent node may change state or have an action, may provide the time delay until such action, may provide an indication of strength of such prediction, and may provide an indication of the strength or belief of the estimated time delay.

Prediction by Sampling

In some cases, however, the time series data for all parents of a desired child node, e.g., query node, may not be known. Each unknown time series that is a parent to the query node may be considered a hidden node. In a Bayesian network, prediction may be accomplished by marginalizing over the hidden nodes using the data in the observed nodes (e.g., the observed parents nodes of the query node). Marginalizing over a hidden node amounts to integrating over all possible time series for a particular node which in general, may be impractical. To resolve the impracticality, the hidden node time series data may be approximated.

In one example, marginalization of the hidden nodes may be performed by using a few instantiations of the hidden nodes which can be obtained by sampling from the network. The samples can be used to obtain averaged rate estimates at each of the query nodes. The sampling procedure may be the same or different from the sampling procedure described above. In one example, the sampling procedure described above may be modified such that the sampling may be conditioned on the data that has been observed in the parent data nodes. If the data for a child node i is completely known, then the parent nodes of node i do not have any influence on the child node i in the subsequent sampling process. In this manner, the parental relationships can be removed for the fully observed nodes and a new network S' may be obtained where S'=S−{i→j, i are an element of the observed nodes, and j is an element of the parent nodes of i}. Sampling is done from the new network S' for all the unobserved nodes and then average hazard rates can be obtained for all the query nodes.

Prediction by Estimation of Steady State Hazard Rate

In another example to resolve the inference approximation, the empirical hazard rate $\hat{\lambda}$ may be approximated with a steady state rate. In the model described above, the hazard rate of a node can be written as:

$$\lambda_i(t) = \exp\left(w_{i,0} + \sum_{j=1}^{V} \left(w_{i,j}\ln(1 + \hat{\lambda}_{i,j}(t))\right)\right) \quad (12)$$

Equation (12) above is equal to equation (9) above if $w_{i,j}=0$ for all the pairs of nodes which are not dependent. The empirical rate $\hat{\lambda}_{i,j}(t)$ cannot be obtained unless the whole time series is observed. Thus, the empirical rate may be approximated by the true rate by:

$$\hat{\lambda}_{i,j}(t) = \frac{n_{i,j}(t)}{\varphi} \approx \frac{1}{\varphi}\int_{-\varphi}^{t} \lambda_j(\tilde{t})d\tilde{t} \approx \lambda_j(t) \quad (13)$$

where the length of the time window $\phi$ is assumed to be very small. Substituting equation (13) into equation (12) above:

$$\ln(\lambda_i(t)) \approx w_{i,0} + \sum_{j=1}^{V} w_{i,j}\ln(1 + \lambda_j(t)) \quad (14)$$

Assuming that the hazard rate is constant in the time interval [t-φ,t] allows the assumption that the Poisson process of each of the parents j (from 1 to V) is a homogeneous Poisson process with rate $\lambda_j(t)$: Based on equation (14) above, the hazard rates can be constructed for each node that is not observed and the set of equations have the form of:

$$\lambda(t)=F\lambda(t))$$

where F: $R^V \rightarrow R^V$ whose solution are the fixed points of the system. The fixed point iterations may start from randomly initialized values for $\lambda_i(t)$ where i is from 1 to V. In some cases, at convergence, the estimated rate may correspond to the mean rate in the time interval [t-φ, t] calculated from actual data.

Figure 7:
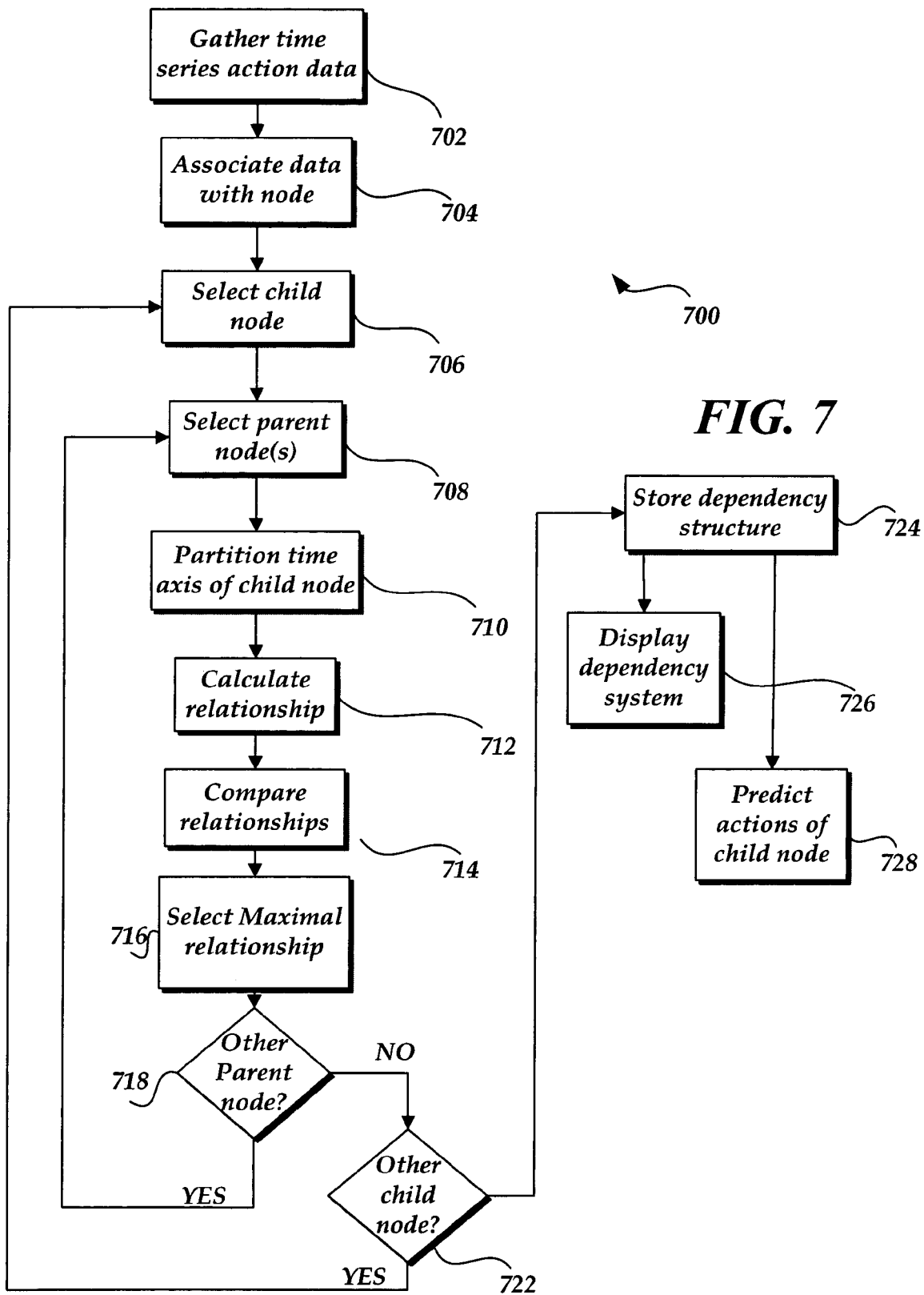
FIG. 7 is a flow chart of an example method of learning a dependency structure of FIG. 2.

An example method 700 is illustrated in FIG. 7. The time series data of one or more nodes may be gathered 702 in any suitable manner such as through state and/or event logging system. Each time series data may be associated 704 with a node of a node system. A child node may be selected 706 from the nodes of the node system. One or more parents of the child node may be selected 708 from the remaining nodes of the node system and/or the null set representing no parents to the child node. At least a portion of the child node time axis may be partitioned 710 based on the action time series data of the parent node(s). For example, with state-based action time series data, the up state of the child node may be partitioned, and with event based action time series data, the entire time axis of the child node may be partitioned. Based on the partitioned segments of the child node, the likelihood of a relationship between the selected child node and selected parent node(s) may be calculated 712. For example, in a two state or maximum two event count system and only one parent node, the exact solution may be determined as discussed with respect to equations (1)-(8). For a multi-state and/or event count system, the approximated solution may be determined as noted above with respect to equations (9)-(14). The likelihood of the selected relationship may be compared 714 to the null relationship, e.g., no parent, or to the relationship of previously selected parents. The maximal relationship may be selected 716. If there are other parent relationships to test 718, the process may return to selecting 708 another parent node, until all parent node combinations have been determined. The maximal parental relationship may be stored 720 for the selected child node. If there are other child node relationships to be determined 722, the process may return to selecting 706 another child node, until all maximal parental relationships for each node in the system is determined. The maximal parent relationships for each child node may be stored 724 as a dependency system which may indicate the dependency relationship between selected nodes, the strength of the relationship, the average waiting time of an action in the selected child node, and/or the strength of the waiting time prediction, or any other data indicative of the dependency system. As discussed with reference to storing time series data, the determined dependency structure may be stored in any suitable manner, such as in a data store. The dependency system may be displayed 726 to illustrate a directed graph. The dependency system may be used to predict 728 actions of the child node based on observed time series data from one or more parent nodes of the selected child node, e.g., query node.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method comprising:
    a) gathering a first time series of event data of a first server;
    b) gathering a second time series of event data of a second server;
    c) partitioning a timeline of the first time series into at least one time segment based on the second time series and a predetermined time window duration;
    d) counting a number of events of the second time series in each of the at least one time segment;
    e) determining a likelihood of a dependency relationship of the first time series from the second time series based on the number of events in each of the at least one time segment;
    f) determining a likelihood of no dependency relationship of the first time series from the second time series including determining a probability of the first time series as a function of a normalization constant; and
    g) selecting, by a processor, a maximum of the likelihood of the dependency relationship of the first time series from the second time series, and the likelihood of no dependency relationship of the first time series from the second time series.

2. The method of claim 1, wherein determining a likelihood of a dependency relationship of the first time series from the second time series includes determining a probability of the first time series given the second time series as a function of the normalization constant.

3. The method of claim 2, wherein determining a probability of the first time series given the second time series includes approximating a probability distribution of a weighting parameter.

4. The method of claim 1, further comprising gathering a third time series of event data of a third server and determining a likelihood of a dependency relationship of the first time series from a combination of the second time series and the third time series.

5. The method of claim 1, wherein determining a likelihood of a dependency relationship includes formulating a generalized linear model for a hazard rate function based on the number of events in each time segment.

6. The method of claim 5, wherein formulating a generalized linear model includes modeling the hazard rate function as an exponential weighting function.

7. The method of claim 1, further comprising determining a dependency structure of a system comprising the first time series and the second time series by determining a likelihood of a dependency relationship for each of the first and second time series of data.

8. The method of claim 1, further comprising predicting an event of the first time series based on the second time series and the determined dependency relationship of the first time series from the second time series.

9. The method of claim 1, further comprising displaying the determined dependency relationship of the first time series on the second time series on a display device of a computer system, wherein the first time series is displayed as a first node and the second time series is displayed as a second node, and the dependency relationship is displayed as a directed connector from the second node to the first node, and a strength of the determined dependency relationship is associated with the directed connector.

10. One or more computer storage media containing computer executable instructions that, when implemented, perform a method comprising:
    a) storing a first time series of data of a first server as a sequence of time stamps, each time stamp being associated with one of a state up indicator and a state down indicator;
    b) storing a second time series of data of a second server as a sequence of time stamps, each time stamp being associated with one of a state up indicator and a state down indicator;
    c) partitioning a timeline of the first time series into at least one time segment based on the second time series;
    d) determining a likelihood of a dependency relationship of the first time series from the second time series;
    e) determining a likelihood of no dependency relationship of the first time series from the second time series including determining a probability of the first time series as a function of a normalization constant;

f) selecting a maximum of the likelihood of the dependency relationship of the first time series from the second time series and the likelihood of no dependency relationship of the first time series from the second time series; and g) when the selected maximum is the likelihood of the dependency relationship of the first time series from the second time series, displaying the determined dependency relationship of the first time series on the second time series on a display device of a computer system, wherein the first time series is displayed as a first node and the second time series is displayed as a second node, and the dependency relationship is displayed as a directed connector from the second node to the first node, and a strength of the determined dependency relationship is associated with the directed connector.

11. The one or more computer storage media of claim 10, wherein partitioning includes partitioning only segments of the timeline associated with a state up indicator of the first time series of data.

12. The one or more computer storage media of claim 10, wherein the state up indicator indicates a component up condition and the state down indicator indicates a component down condition.

13. The one or more computer storage media of claim 10, wherein the state up indicator indicates zero events occurring in a predetermined window in the past, and the state down indicator indicates one event occurring in a predetermined window in the past.

* * * * *

UNITED STATES PATENT AND TRADEMARK OFFICE
CERTIFICATE OF CORRECTION

| | | |
|---|---|---|
| PATENT NO. | : 7,702,482 B2 | Page 1 of 1 |
| APPLICATION NO. | : 11/027188 | |
| DATED | : April 20, 2010 | |
| INVENTOR(S) | : Thore K H Graepel et al. | |

It is certified that error appears in the above-identified patent and that said Letters Patent is hereby corrected as shown below:

Cover page, item (75), under "Inventors" column 1, line 3, delete "Shyansundar" and insert -- Shyamsundar --, therefor.

Signed and Sealed this
First Day of February, 2011

David J. Kappos
*Director of the United States Patent and Trademark Office*